US006630222B1

(12) United States Patent
Fay et al.

(10) Patent No.: US 6,630,222 B1
(45) Date of Patent: Oct. 7, 2003

(54) ACOUSTIC MEDIA

(75) Inventors: Ralph Michael Fay, Lakewood, CO (US); Lawrence J. Gelin, Littleton, CO (US)

(73) Assignee: Johns Manville International, Inc., Denver, CO (US)

(*) Notice: Subject to any disclaimer, the term of this patent is extended or adjusted under 35 U.S.C. 154(b) by 250 days.

(21) Appl. No.: 09/595,484

(22) Filed: Jun. 16, 2000

(51) Int. Cl.[7] .................................................. B32B 3/12

(52) U.S. Cl. ......................... 428/118; 428/116; 428/12; 428/188; 52/144; 52/506.01; 181/210; 181/286; 181/287; 181/288; 181/290; 160/348; 160/84.05

(58) Field of Search ........................... 428/116, 12, 118, 428/188; 52/506.01, 144; 181/175, 210, 284, 286, 287, 288, 290; 160/348, 84.05

(56) References Cited

U.S. PATENT DOCUMENTS 4,388,354 A * 6/1983 Suominen

FOREIGN PATENT DOCUMENTS

DE 4422585 * 10/1995

* cited by examiner

*Primary Examiner*—Deborah Jones
*Assistant Examiner*—Wendy Boss
(74) *Attorney, Agent, or Firm*—Robert D. Touslee

(57) ABSTRACT

An acoustic medium for temporary acoustic treatment of a room is formed from one or more continuous curtains, preferably, with pleated first and second major surfaces. Each pleated curtain preferably has one or more series of collapsible elongated tubular sections which form the pleats that make up the major surfaces of the curtain. Since the elongated tubular sections are collapsible, the curtain can be retracted by collapsing the elongated tubular sections and extended by opening the elongated tubular sections. The mat materials forming the elongated tubular sections and the pleated major surfaces of the curtain provide the curtain with an airflow resistance through the curtain, in a direction generally perpendicular to the planes containing the apexes of the pleats forming the first and second major surfaces of the curtain, that has the desired properties for absorbing or reflecting sound.

30 Claims, 6 Drawing Sheets

ACOUSTIC MEDIA

BACKGROUND OF THE INVENTION

The present invention relates to acoustic media for absorbing or reflecting sound, and in particular to acoustic media, preferably a high performance honeycomb acoustic media, which can be extended and retracted to enhance the acoustics of an environment “on demand”.

Many rooms in homes, schools and offices are built and furnished with primarily flat, hard surfaces such as sheetrock walls, hardwood floors, and many windows. While the acoustical performance of such rooms can be acceptable for many uses, the acoustical performance of such rooms can be inadequate for many uses where acoustics are important in carrying out and/or enjoying an activity, such as when the rooms are to be used for lectures, home theaters, music rooms, etc. For example, in a school, it may be desirable, for reasons of overcrowding or other reasons, to use a room that is normally used as a conventional classroom as a music room for certain class periods of the day and as a classroom for the remaining class periods of the day. While the acoustics of the room may be acceptable for conducting classes, the acoustics could be totally inadequate for playing music. Thus, to enable the room to serve both functions, to serve as a classroom and as a music room, the ability to quickly and easily change and enhance the acoustics of the room to convert the room from a classroom to a music room and the ability to quickly and easily convert the room from a music room back into a conventional classroom would be quite desirable. While a classroom has been used as an example, the ability to quickly and easily change and enhance the acoustics of a room (temporarily acoustically treat the room) so that the room can better serve different uses applies to many home, school and office situations. Even in a room that is dedicated to a particular use, such as some music rooms and some home theaters, the ability to easily and quickly change and enhance the acoustical properties of the room (acoustically treat the room) to meet the acoustical requirements for a particular composition or movie would be quite desirable.

SUMMARY OF THE INVENTION

The acoustic media of the present invention can be used to absorb or reflect sound and can be used to easily and quickly change and enhance the acoustical performance of a room and to easily and quickly change the acoustic performance of the room back to its original state.

Preferably, the acoustic media of the present invention is a honeycomb acoustic media, having one or more series of collapsible elongated tubular sections with polygonal transverse cross sections, that is formed into a continuous curtain with pleated first and second major surfaces. Preferably, the collapsible elongated tubular sections have square, rectangular or hexagonal cross sections, most preferably hexagonal cross sections, and form the pleats that make up the major surfaces of the pleated curtain. (As used herein, the term hexagonal cross section, means a transverse cross section that has six sides and six angles. The six sides and six angles of the hexagonal cross section may be equal or differ as long as the elongated tubular sections having hexagonal transverse cross sections are collapsible.) Since the elongated tubular sections are collapsible, the pleated curtain can be retracted by collapsing the elongated tubular sections and extended by opening the elongated tubular sections. The mat materials forming the elongated tubular sections and the pleated major surfaces of the curtain provide the pleated curtain with an airflow resistance through the curtain, in a direction generally perpendicular to the planes containing the apexes of the pleats forming the first and second major surfaces of the curtain, that has the desired properties for absorbing or reflecting sound.

Preferably, the pleated curtain formed by the honeycomb acoustic media of the present invention includes a head rail and a bottom rail. The pleated curtain depends from the head rail and the bottom rail is secured to a bottom end of the pleated curtain. Lines or cords extend from and connect the bottom rail to a raising and lowering mechanism in the head rail for extending and retracting the curtain in a vertical direction.

Thus, with a pleated curtain formed from the honeycomb acoustic media of the present invention, the acoustical performance of a room (e.g. a room with acoustically rigid surfaces or a specific purpose room) can be enhanced or treated, on demand, merely by lowering the decorative, high performance acoustic media curtain of the present invention and the acoustical performance of the room can be returned to its original state, on demand, merely by raising the acoustic media curtain of the present invention. For example, prior to watching a surround sound movie, one or more sound absorbing and/or sound reflecting pleated acoustic media curtains of the present invention can be lowered by remote control from recesses in the ceiling to create a desired acoustical environment. In classrooms, one or more high performance, acoustic media curtains can be lowered from a ceiling during lectures for improved speech intelligibility and then retracted from high-traffic areas during recess. The high performance, acoustic media curtains can also be used in various multi-use auditoriums to change, enhance or tailor the auditoriums' acoustical performance for specific or special uses or needs.

While the honeycomb acoustic media of the present invention is preferred, the acoustic media of the present invention may also include pleated curtains without a honeycomb structure and pleatless curtains, such as a series of curtains with various airflow resistances. While the acoustic media of the present invention is typically used as an extendable and retractable wall treatment located adjacent but spaced outwardly from a wall and intermediate an acoustical source and the wall, the acoustic media of the present invention may also be used as an extendable and retractable room divider and as an extendable and retractable ceiling treatment adjacent but spaced outwardly from a ceiling and intermediate an acoustical source and the ceiling. As used in the previous sentence the terms wall and ceiling refer to generally flat, acoustically rigid room surfaces, such as but not limited to, flat, hard sheetrock or wooden surfaces and/or window surfaces. In addition, while the acoustic curtains of the present invention made from the acoustic media of the present invention are shown and described as deploying or extending and retracting in generally vertical directions, the acoustic curtains of the present invention can also be deployed and retracted in a horizontal direction, e.g. a floor to ceiling acoustic curtain of the present invention can be extended or deployed in a horizontal direction along and adjacent a wall by pulling the curtain open and retracted by pulling the acoustic curtain closed.

DESCRIPTION OF THE PREFERRED EMBODIMENTS

Figure 1:
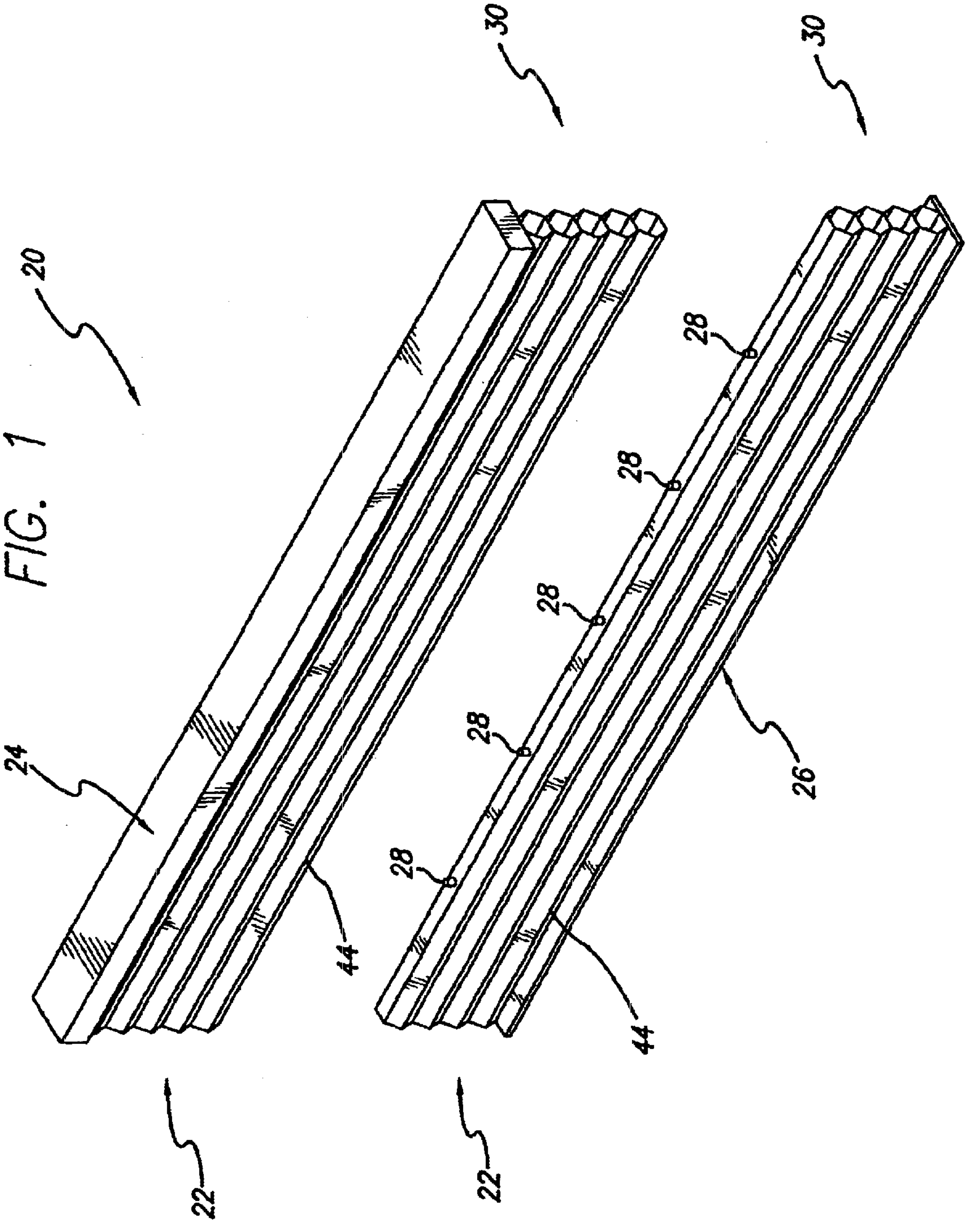
FIG. 1 is a schematic perspective view, with a midportion broken away, of an extendable and retractable pleated curtain of the present invention.
Figure 2:
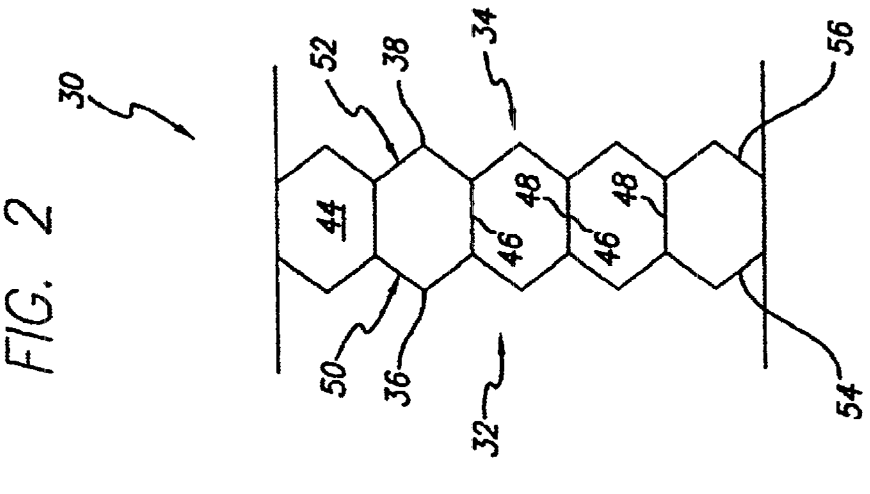
FIG. 2 is a schematic vertical transverse cross section through a first embodiment of the honeycomb acoustic media of the present invention with the elongated tubular sections of the media fully open.

FIG. 1 shows a curtain assembly 20, with a portion broken away, which includes a pleated curtain 22 made of the pleated honeycomb acoustic medium 30 of FIG. 2. In addition to the pleated curtain 22, the curtain assembly 20 also includes a head rail 24 and a bottom rail 26. Cords 28, secured to the bottom rail 26, pass from the bottom rail 26 up through the pleated curtain 22 to a conventional mechanism (not shown), either electronic and motor driven or hand operated, in the head rail 24 for winding up and unwinding the cords 28 to retract and store or extend and deploy the pleated curtain 22. The pleated curtain 22 may be of any length sufficient to provide a desired acoustical treatment for a room, e.g. from about 3 to about 8 feet long, but, typically, has a length at least equal to the floor to ceiling height of a room in which it is to be used so that, if required for the desired acoustical treatment, the pleated curtain 22 can be fully deployed from the ceiling to the floor of a room. The pleated curtain 22 may be of any width, e.g. 6 to 12 feet in width, sufficient to provide a desired acoustical treatment, alone or in combination with other curtains. The major factor limiting the width of the pleated curtain 22, other than the length of a wall with which the pleated curtain is to be used, would be difficulties encountered in the handling of curtains over a certain width due to the curtain's weight, etc. While FIG. 1 only shows the pleated honeycomb acoustic medium 30 of FIG. 2 used as the acoustic medium of the pleated curtain 22, any of the acoustic media 130, 230, 330 and 430 of FIGS. 3–6 may be substituted for the pleated honeycomb acoustic medium 30 as the acoustic medium for the pleated curtain 22.

Figure 3:
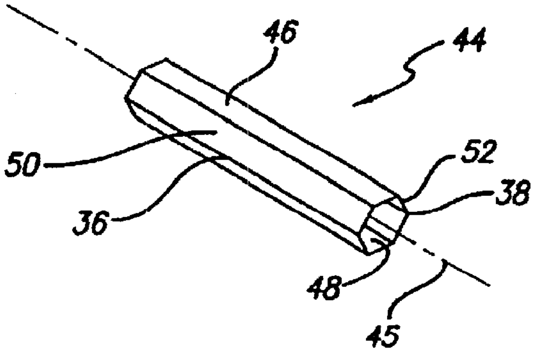
FIG. 3 is a schematic perspective view of a portion of an elongated tubular section of FIG. 2.

The honeycomb acoustic medium 30 of FIG. 2, for absorbing or reflecting sound, forms a continuous pleated curtain of any desired length and width with pleated first and second major surfaces 32 and 34. The apexes 36 and 38 of the pleats forming the first and second major surfaces 32 and 34, respectively, of the honeycomb acoustic medium 30 each lie or substantially lie in common vertical planes. The honeycomb acoustic medium 30 is made up of a series of elongated, collapsible, tubular sections 44 having longitudinal centerlines 45 which are parallel with respect to each other. The elongated, collapsible, tubular sections 44 each have a hexagonal cross section of six sides and six apexes. Two sidewalls 46 and 48 of each of the elongated tubular sections 44, which are opposed to each other, extend parallel to and are bonded or otherwise joined to corresponding sidewalls 46 and 48 of adjacent elongated tubular sections 44 to form the honeycomb acoustic medium 30. The remaining four sides and intermediate apexes of each elongated tubular section 44 form opposed pleats 50 and 52 which project outwardly with respect to the longitudinal centerline 45 of the elongated tubular section as shown in FIG. 3. The opposed outwardly extending pleats of the tubular sections 44 collectively forming the first and second pleated major surfaces 32 and 34 of the honeycomb acoustic medium 30.

The depths of the tubular sections 44 between the apexes 36 and 38 of the pleats 50 and 52 when the tubular sections are fully open (the thickness of the honeycomb acoustic medium 30 when the tubular sleeves 44 are open), typically, ranges from about ⅜ of an inch to about 1⅛ of an inch. The heights of the tubular sections 44 between the opposed sidewalls 46 and 48 of the tubular sections 44 when the tubular sections are fully open, typically, ranges from about ⅜ of an inch to about 1⅛ of an inch.

With their hexagonal tubular transverse cross section, each of the elongated tubular sections 44 is collapsible in a direction generally parallel to the planes containing the apexes 36 and 38 of the pleats 50 and 52 forming the first and second major surfaces 32 and 34 of the honeycomb acoustic medium 30, as well as the major surfaces of any pleated curtain made from the honeycomb acoustic medium 30, and perpendicular to the opposed sidewalls 46 and 48 of each of the elongated tubular sections 44. Thus, the honeycomb acoustic medium 30 and any pleated curtain made from the honeycomb acoustic medium 30 can be retracted, e.g. by winding up the cords 28 and collapsing the elongated tubular sections 44 and extended, e.g. by unwinding the cords 28 and allowing the elongated tubular sections 44 to open.

The first pleated major surface 32 of the honeycomb acoustic medium 30, as well as any curtain made from the honeycomb acoustic medium 30, is formed by a first mat 54 and the second pleated major surface 34 of the honeycomb acoustic medium 30, as well as any curtain made from the honeycomb acoustic medium 30, is formed by a second mat 56. Typically, the mats 54 and 56 are nonwoven mats, spunbond mats or woven mats made of various textile materials, such as but not limited to, nonwoven glass fiber mats and spunbond mats of polyester, polypropylene or polyethylene.

The first and second mats 54 and 56 may have the same or substantially the same airflow resistance through the mats in a direction perpendicular to the major surfaces of the mats 54 and 56. However, one of the mats 54 and 56 may have a greater airflow resistance through the mat in a direction perpendicular to the major surface of the mat than the other mat. Where the mats 54 and 56 have different airflow resistances and the honeycomb acoustic medium 30 is used as a sound absorbing medium for low frequency sounds, preferably, for better sound absorption at frequencies below 500 cycles per second, the mat forming the major surface of the medium facing the acoustical source, e.g. major surface 32, has a greater airflow resistance than the mat forming the opposite major surface of the medium, e.g. major surface 34. Where the mats 54 and 56 have different airflow resistances and the honeycomb acoustic medium 30 is used as a sound absorbing medium for higher frequency sounds, preferably, for better sound absorption at frequencies above 500 cycles per second, the mat forming the major surface of the medium facing the acoustical source, e.g. major surface 32, has a lower airflow resistance than the mat forming the opposite major surface of the medium, e.g. major surface 34.

When the honeycomb acoustic medium 30 is being used as a sound absorbing medium and the tubular sections 44 of the honeycomb acoustic medium 30 are fully open, preferably, the honeycomb acoustic medium 30, as well as any curtain made from the honeycomb acoustic medium 30, has an airflow resistance through the medium 30 in a direction generally perpendicular to the planes containing the apexes 36 and 38 of the pleats 50 and 52 forming the first and second major surfaces 32 and 34 of the medium 30 and any pleated curtain made from the medium 30, between 200 MKS rayls and 1000 MKS rayls. The ideal airflow resistance of the honeycomb acoustic medium 30 and depths of the tubular sections 44 forming the honeycomb acoustic medium 30 depends on the spacing of the honeycomb acoustic medium from the glass pane(s) or wall behind the honeycomb acoustic medium. However, a pleated curtain, made from a honeycomb acoustic medium 30 with an airflow resistance between 250 MKS rayls and 350 MKS rayls through the honeycomb acoustic medium 30, in combination with an air space behind such a pleated curtain of about ⅜ to about 1⅛ inches normally absorbs sound quite well.

When the honeycomb acoustic medium 30 is being used as a sound reflecting medium and the tubular sections 44 of the honeycomb acoustic medium 30 are fully open, preferably, the honeycomb acoustic medium 30, as well as any curtain made from the medium, has an airflow resistance through the medium 30, in a direction generally perpendicular to the planes containing the apexes 36 and 38 of the pleats 50 and 52 forming the first and second major surfaces 32 and 34 of the medium 30 and any pleated curtain made from the medium, of at least 10,000 MKS rayls. Preferably, for better sound reflection, the mat forming the major surface of the honeycomb acoustic medium 30 facing the acoustical source, e.g. major surface 32, has an airflow resistance of at least 10,000 MKS rayls.

Figure 4:
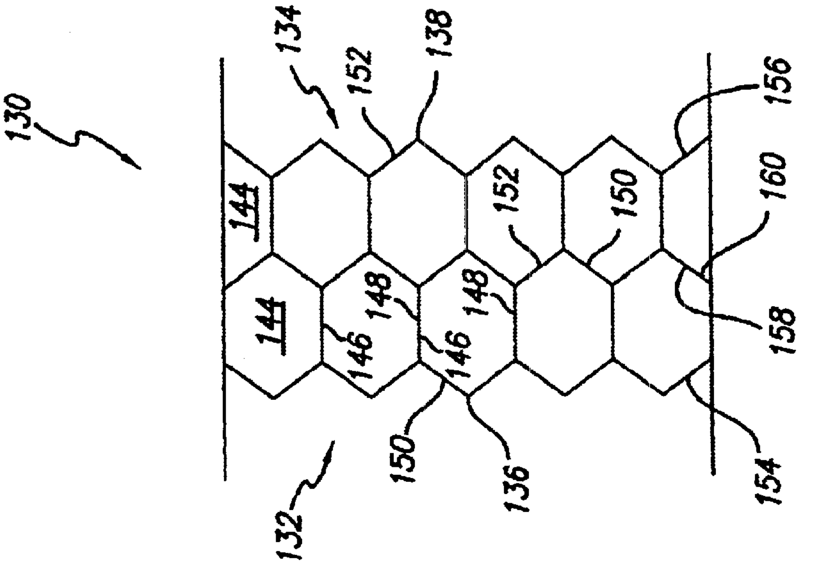
FIG. 4 is a schematic vertical transverse cross section through a second embodiment of the honeycomb acoustic media of the present invention with the elongated tubular sections of the media fully open.

The honeycomb acoustic medium 130 of FIG. 4, for absorbing or reflecting sound, forms a continuous pleated curtain of any desired length and width with pleated first and second major surfaces 132 and 134. The apexes 136 and 138 of the pleats forming the first and second major surfaces 132 and 134, respectively, of the honeycomb acoustic medium 130 each lie or substantially lie in common vertical planes. The honeycomb acoustic medium 130 is made up of a first and a second series of elongated, collapsible, tubular sections 144 having longitudinal centerlines which extend parallel with respect to each other. The elongated, collapsible, tubular sections 144 each have a hexagonal cross section of six sides and six apexes. Two sidewalls 146 and 148 of each of the elongated tubular sections 144, which are opposed to each other, extend parallel to and are bonded or otherwise joined to corresponding sidewalls 146 and 148 of adjacent elongated tubular sections 144 to form the first series and the second series of tubular sections of the honeycomb acoustic medium 130. The remaining four sides and intermediate apexes of each elongated tubular section 144 form opposed pleats 150 and 152 which project outwardly with respect to the longitudinal centerline of the elongated tubular section. The pleats 152 of the first series of tubular sections 144 and the pleats 150 of the second series of tubular sections 144 are offset with respect to each other, engaged and bonded or otherwise secured together. The pleats 150 of the first series of tubular sections and the pleats 152 of the second series of tubular sections 144 collectively form the first and second pleated major surfaces 132 and 134 of the honeycomb acoustic medium 130.

The depths of each of the tubular sections 144 between the apexes 136 and 138 of the pleats 150 and 152 when the tubular sections 144 are fully open, typically, ranges from about ⅜ of an inch to about 1⅛ of an inch. The heights of the tubular sections 144 between the opposed sidewalls 146 and 148 of the tubular sections 144 when the tubular sections are fully open, typically, ranges from about ⅜ of an inch to about 1⅛ of an inch.

With their hexagonal tubular transverse cross section, each of the elongated tubular sections 144 is collapsible in a direction generally parallel to the planes containing the apexes 136 and 138 of the pleats 150 and 152 forming the first and second major surfaces 132 and 134 of the honeycomb acoustic medium 130, as well as the major surfaces of any pleated curtain made from the honeycomb acoustic medium 130, and perpendicular to the opposed sidewalls 146 and 148 of each of the elongated tubular sections 144. Thus, the honeycomb acoustic medium 130 and any pleated curtain made from the honeycomb acoustic medium 130 can be retracted, e.g. by winding up the cords 28 and collapsing the elongated tubular sections 144 and extended, e.g. by unwinding the cords 28 and allowing the elongated tubular sections 144 to open.

The first pleated major surface 132 of the honeycomb acoustic medium 130, as well as any curtain made from the honeycomb acoustic medium 130, is formed by a first mat 154 and the second pleated major surface 134 of the honeycomb acoustic medium 130, as well as any curtain made from the honeycomb acoustic medium 130, is formed by a second mat 156. The pleats 152 of the first series of hexagonal tubular sections 144 and the pleats 150 of the second series of hexagonal tubular sections 144 are also formed from different mats 158 and 160 respectively. Typically, the mats 154 156, 158 and 160 are nonwoven mats, spunbond mats or woven mats made of various textile materials, such as but not limited to, nonwoven glass fiber mats and spunbond mats of polyester, polypropylene or polyethylene.

The mats 154, 156, 158 and 160 may have the same or substantially the same airflow resistance through the mats in a direction perpendicular to the major surfaces of the mats. However, one or more of the mats 154, 156, 158 and 160 may have airflow resistances through the mats in a direction perpendicular to the major surfaces of the mats that differ from the airflow resistances of other of the mats. Where one or more of the mats 154, 156, 158 and 160 have different airflow resistances and the honeycomb acoustic medium 130 is used as a sound absorbing medium for low frequency sounds, preferably, for better sound absorption at frequencies below 500 cycles per second, the mat forming the major surface of the medium facing the acoustical source, e.g. the mat 154 forming the major surface 132, has the highest airflow resistance and the mat forming the opposite major surface of the medium, e.g. the mat 156 forming the major surface 134 has the lowest airflow resistance. If the mats 158 and 160 forming the internal pleats of the honeycomb media have different airflow resistances, the mat 160 would have the lower airflow resistance. Thus, the airflow resistance through the honeycomb acoustic medium 130 would progressively decrease from the first major surface 132 to the second major surface 134.

Where the mats 154, 156, 158 and 160 have different airflow resistances and the honeycomb acoustic medium 130 is used as a sound absorbing medium for higher frequency sounds, preferably, for better sound absorption at frequencies above 500 cycles per second, the mat forming the major surface of the medium facing the acoustical source, e.g. major surface 132, has the lowest airflow resistance and the mat forming the opposite major surface of the medium, e.g. the mat 156 forming the major surface 134 has the highest airflow resistance. If the mats 158 and 160 forming the internal pleats of the honeycomb media have different airflow resistances, the mat 158 would have the lower airflow resistance. Thus, the airflow resistance through the honeycomb acoustic medium 130 would progressively increase from the first major surface 132 to the second major surface 134.

When the honeycomb acoustic medium 130 is being used as a sound absorbing medium and the tubular sections 144 of the honeycomb acoustic medium 130 are fully open, preferably, the honeycomb acoustic medium 130, as well as any curtain made from the honeycomb acoustic medium 130, has an airflow resistance through the medium 130 in a direction generally perpendicular to the planes containing the apexes 136 and 138 of the pleats 150 and 152 forming the first and second major surfaces 132 and 134 of the medium 130 and any pleated curtain made from the medium 130, between 200 MKS rayls and 1000 MKS rayls. The ideal airflow resistance of the honeycomb acoustic medium 130 and depths of the tubular sections 144 forming the honeycomb acoustic medium 130 depends on the spacing of the honeycomb acoustic medium from the glass pane(s) or wall behind the honeycomb acoustic medium. However, a pleated curtain, made from a honeycomb acoustic medium 130 having an airflow resistance between 250 MKS rayls and 350 MKS rayls through the honeycomb acoustic medium 130, in combination with an air space behind the pleated curtain of about ⅜ to about 1⅛ inches normally absorbs sound quite well.

When the honeycomb acoustic medium 130 is being used as a sound reflecting medium and the hexagonal tubular sections 144 of the honeycomb acoustic medium 130 are fully open, preferably, the honeycomb acoustic medium 130, as well as any curtain made from the medium, has an airflow resistance through the medium 130, in a direction generally perpendicular to the planes containing the apexes 136 and 138 of the pleats 150 and 152 forming the first and second major surfaces 132 and 134 of the medium 130 and any pleated curtain made from the medium, of at least 10,000 MKS rayls. Preferably, for better sound reflection, the mat forming the major surface of the honeycomb acoustic medium 130 facing the acoustical source, e.g. major surface 132, has an airflow resistance of at least 10,000 MKS rayls.

Figure 5:
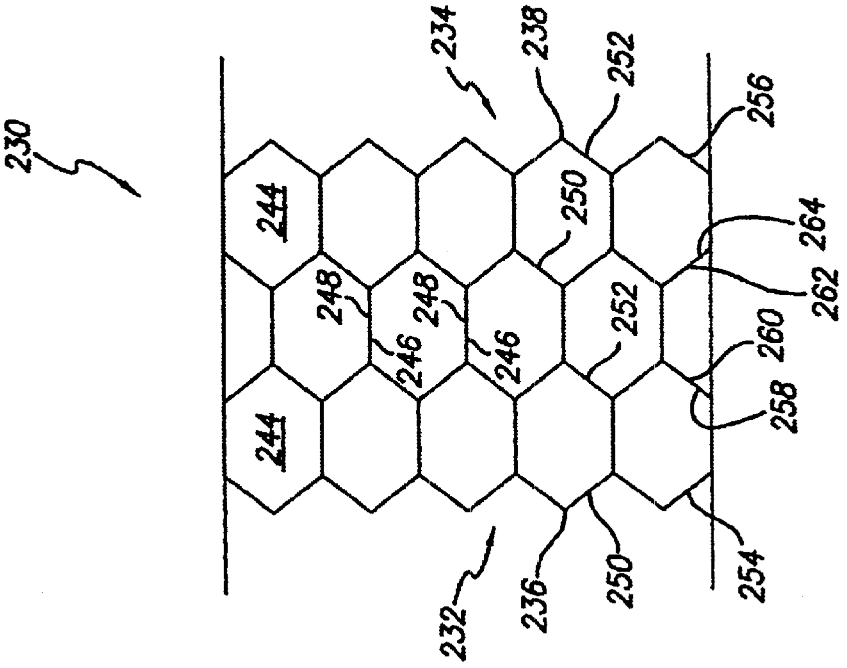
FIG. 5 is a schematic vertical transverse cross section through a third embodiment of the honeycomb acoustic media of the present invention with the elongated tubular sections of the media fully open.

The honeycomb acoustic medium 230 of FIG. 5, for absorbing or reflecting sound, forms a continuous pleated curtain of any desired length with pleated first and second major surfaces 232 and 234. The apexes 236 and 238 of the pleats forming the first and second major surfaces 232 and 234, respectively, of the honeycomb acoustic medium 230 each lie or substantially lie in common vertical planes. The honeycomb acoustic medium 230 is made up of a first, a second and a third series of elongated, collapsible, tubular sections 244 having longitudinal centerlines which extend parallel with respect to each other. The elongated, collapsible, tubular sections 244 each have a hexagonal cross section of six sides and six apexes. Two sidewalls 246 and 248 of each of the elongated tubular sections 244, which are opposed to each other, extend parallel to and are bonded or otherwise joined to corresponding sidewalls 246 and 248 of adjacent elongated tubular sections 244 to form the first, second and third series of tubular sections of the honeycomb acoustic medium 230. The remaining four sides and intermediate apexes of each elongated tubular section 244 form opposed pleats 250 and 252 which project outwardly with respect to the longitudinal centerline of the elongated tubular section. The pleats 252 of the first series of tubular sections 244 and the pleats 250 of the second series of tubular sections 244 are offset with respect to each other, engaged and bonded or otherwise secured together. The pleats 252 of the second series of tubular sections 244 and the pleats 250 of the third series of tubular sections 244 are offset with respect to each other, engaged and bonded or otherwise secured together. The pleats 150 of the first series of tubular sections 244 and the pleats 152 of the third series of tubular sections 244 collectively form the first and second pleated major surfaces 232 and 234 of the honeycomb acoustic medium 230.

The depths of each of the tubular sections 244 between the apexes 236 and 238 of the pleats 250 and 252 when the tubular sections 244 are fully open, typically, ranges from about ⅜ of an inch to about 1⅛ of an inch. The heights of the tubular sections 244 between the opposed sidewalls 246 and 248 of the tubular sections 244 when the tubular sections are fully open, typically, ranges from about ⅜ of an inch to about 1⅛ of an inch.

With their hexagonal tubular transverse cross section, each of the elongated tubular sections 244 is collapsible in a direction generally parallel to the planes containing the apexes 236 and 238 of the pleats 250 and 252 forming the first and second major surfaces 232 and 234 of the honeycomb acoustic medium 230, as well as the major surfaces of any pleated curtain made from the honeycomb acoustic medium 230, and perpendicular to the opposed sidewalls 246 and 248 of each of the elongated tubular sections 244. Thus, the honeycomb acoustic medium 230 and any pleated curtain made from the honeycomb acoustic medium PO 230 can be retracted, e.g. by winding up the cords 28 and collapsing the elongated tubular sections 244 and extended, e.g. by unwinding the cords 28 and allowing the elongated tubular sections 244 to open.

The first pleated major surface 232 of the honeycomb acoustic medium 230, as well as any curtain made from the honeycomb acoustic medium 230, is formed by a first mat 254 and the second pleated major surface 234 of the honeycomb acoustic medium 230, as well as any curtain made from the honeycomb acoustic medium 230, is formed by a second mat 256. The pleats 252 of the first series of hexagonal tubular sections 244 are formed from mat 258; the pleats 250 and 252 of the second series of hexagonal tubular sections 244 are formed from mats 260 and 262; and the pleats 250 of the third series of hexagonal tubular sections 244 are formed from mat 264. Typically, the mats 254, 256, 258, 260, 262 and 264 are nonwoven mats, spunbond mats or woven mats made of various textile materials, such as but not limited to, nonwoven glass fiber mats and spunbond mats of polyester, polypropylene or polyethylene.

The mats 254, 256, 258, 260, 262 and 264 may have the same or substantially the same airflow resistance through the mats in a direction perpendicular to the major surfaces of the mats. However, one or more of the mats 254, 256, 258, 260, 262 and 264 may have airflow resistances through the mats in a direction perpendicular to the major surfaces of the mats that differ from the airflow resistances of other of the mats. Where one or more of the mats 254, 256, 258, 260, 262 and 264 have different airflow resistances and the honeycomb acoustic medium 230 is used as a sound absorbing medium for low frequency sounds, preferably, for better sound absorption at frequencies below 500 cycles per second, the mat forming the major surface of the medium facing the acoustical source, e.g. the mat 254 forming the major surface 232, has the highest airflow resistance and the mat forming the opposite major surface of the medium, e.g. the mat 256 forming the major surface 234 has the lowest airflow resistance. If the mats 258, 260, 262 and 264 forming the internal pleats of the honeycomb media have different airflow resistances, the mats forming the pleats closest to the major surface 232 would have the higher airflow resistances. Thus, the airflow resistance through the honeycomb acoustic medium 230 would progressively decrease from the first major surface 232 to the second major surface 234.

Where the mats 254, 256, 258, 260, 262 and 264 have different airflow resistances and the honeycomb acoustic medium 230 is used as a sound absorbing medium for higher frequency sounds, preferably, for better sound absorption at frequencies above 500 cycles per second, the mat forming the major surface of the medium facing the acoustical source, e.g. major surface 232, has the lowest airflow resistance and the mat forming the opposite major surface of the medium, e.g. the mat 256 forming the major surface.234 has the highest airflow resistance. If the mats 258, 260, 262 and 264 forming the internal pleats of the honeycomb media have different airflow resistances, the mats forming the pleats closest to the major surface 232 would have the lower airflow resistances. Thus, the airflow resistance through the honeycomb acoustic medium 230 would progressively increase from the first major surface 232 to the second major surface 234.

When the honeycomb acoustic medium 230 is being used as a sound absorbing medium and the tubular sections 244 of the honeycomb acoustic medium 230 are fully open, preferably, the honeycomb acoustic medium 230, as well as any curtain made from the honeycomb acoustic medium 230, has an airflow resistance through the medium 230 in a direction generally perpendicular to the planes containing the apexes 236 and 238 of the pleats 250 and 252 forming the first and second major surfaces 232 and 234 of the medium 230 and any pleated curtain made from the medium 230, between 200 MKS rayls and 1000 MKS rayls. The ideal airflow resistance of the honeycomb acoustic medium 230 and depths of the tubular sections 244 forming the honeycomb acoustic medium 230 depends on the spacing of the honeycomb acoustic medium from the glass pane(s) or wall behind the honeycomb acoustic medium. However, a pleated curtain, made from a honeycomb acoustic medium 230 having an airflow resistance between 250 MKS rayls and 350 MKS rayls through the honeycomb acoustic medium 230, in combination with an air space behind the pleated curtain of about ⅜ to about 1⅛ inches normally absorbs sound quite well.

When the honeycomb acoustic medium 230 is being used as a sound reflecting medium and the hexagonal tubular sections 244 of the honeycomb acoustic medium 230 are fully open, preferably, the honeycomb acoustic medium 230, as well as any curtain made from the medium, has an airflow resistance through the medium 230, in a direction generally perpendicular to the planes containing the apexes 236 and 238 of the pleats 250 and 252 forming the first and second major surfaces 232 and 234 of the medium 230 and any pleated curtain made from the medium, of at least 10,000 MKS rayls. Preferably, for better sound reflection, the mat forming the major surface of the honeycomb acoustic medium 230 facing the acoustical source, e.g. major surface 232, has an airflow resistance of at least 10,000 MKS rayls.

Figure 6:
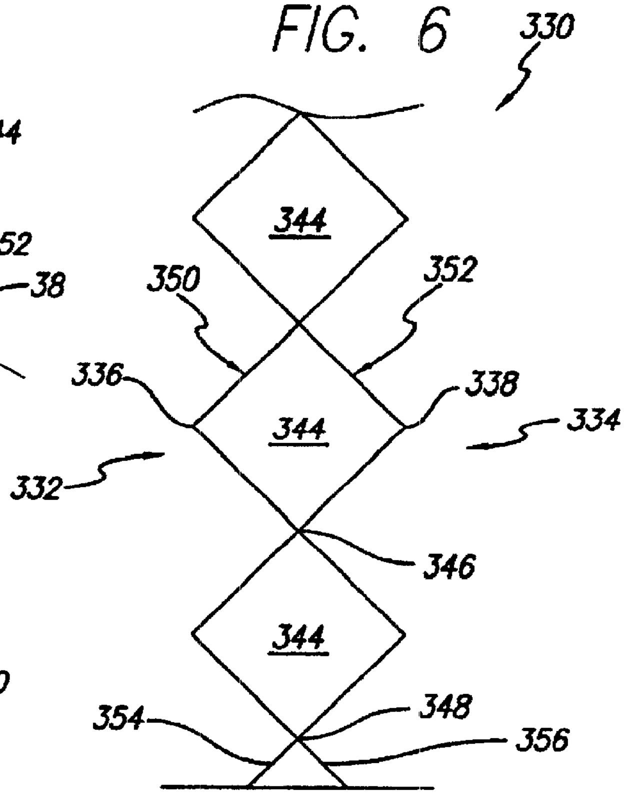
FIG. 6 is a schematic vertical transverse cross section through a fourth embodiment of the honeycomb acoustic media of the present invention with the elongated tubular sections of the media fully open.

The honeycomb acoustic medium 330 of FIG. 6, for absorbing or reflecting sound, forms a continuous pleated curtain of any desired length and width with pleated first and second major surfaces 332 and 334. The apexes 336 and 338 of the pleats 350 and 352 forming the first and second major surfaces 332 and 334, respectively, of the honeycomb acoustic medium 330 each lie or substantially lie in common vertical planes. The honeycomb acoustic medium 330 is made up of a series of elongated, collapsible, tubular sections 344 having longitudinal centerlines which extend parallel with respect to each other. The elongated, collapsible, tubular sections 344 each have a rectangular or square cross section. Two apexes 346 and 348 of each of the elongated tubular sections 344, which are opposed to each other, are bonded or otherwise joined to corresponding apexes 346 and 348 of adjacent elongated tubular sections 344 to form the honeycomb acoustic medium 30. The four sides and intermediate apexes 336 and 338 of each elongated tubular section 344 form the opposed pleats 350 and 352 which project outwardly with respect to the longitudinal centerline of the elongated tubular section. The opposed pleats 350 and 352 of the tubular sections 344 collectively forming the first and second pleated major surfaces 332 and 334 of the honeycomb acoustic medium 330.

The depths of the tubular sections 344 between the apexes 336 and 338 of the pleats 350 and 352 when the tubular sections are fully open (the thickness of the honeycomb acoustic medium 330 when the tubular sleeves 344 are open), typically, ranges from about ⅜ of an inch to about 1⅛ of an inch. The heights of the tubular sections 344 between the opposed apexes 346 and 348 of the tubular sections 344 when the tubular sections are fully open, typically, ranges from about ⅜ of an inch to about 1⅛ of an inch.

With their rectangular or square tubular transverse cross section, each of the elongated tubular sections 344 is collapsible in a direction generally parallel to the planes containing the apexes 336 and 338 of the pleats 350 and 352 forming the first and second major surfaces 332 and 334 of the honeycomb acoustic medium 330, as well as the major surfaces of any pleated curtain made from the honeycomb acoustic medium 330, and perpendicular to the longitudinal centerlines of each of the elongated tubular sections 344. Thus, the honeycomb acoustic medium 330 and any pleated curtain made from the honeycomb acoustic medium 330 can be retracted, e.g. by winding up the cords 28 and collapsing the elongated tubular sections 344 and extended, e.g. by unwinding the cords 28 and allowing the elongated tubular sections 344 to open.

The first pleated major surface 332 of the honeycomb acoustic medium 330, as well as any curtain made from the honeycomb acoustic medium 330, is formed by a first mat 354 and the second pleated major surface 334 of the honeycomb acoustic medium 330, as well as any curtain made from the honeycomb acoustic medium 330, is formed by a second mat 356. Typically, the mats 354 and 356 are nonwoven mats, spunbond mats or woven mats made of various textile materials, such as but not limited to, nonwoven glass fiber mats and spunbond mats of polyester, polypropylene or polyethylene.

The first and second mats 354 and 356 may have the same or substantially the same airflow resistance through the mats in a direction perpendicular to the major surfaces of the mats 354 and 356. However, one of the mats 354 and 356 may have a greater airflow resistance through the mat in a direction perpendicular to the major surface of the mat than the other mat. Where the mats 354 and 356 have different airflow resistances and the honeycomb acoustic medium 330 is used as a sound absorbing medium for low frequency sounds, preferably, for better sound absorption at frequencies below 500 cycles per second, the mat forming the major surface of the medium facing the acoustical source, e.g. major surface 332, has a higher airflow resistance than the mat forming the opposite major surface of the medium, e.g. major surface 334. Where the mats 354 and 356 have different airflow resistances and the honeycomb acoustic medium 330 is used as a sound absorbing medium for higher frequency sounds, preferably, for better sound absorption at frequencies above 500 cycles per second, the mat forming the major surface of the medium facing the acoustical source, e.g. major surface 332, has a lower airflow resistance than the mat forming the opposite major surface of the medium, e.g. major surface 334.

When the honeycomb acoustic medium 330 is being used as a sound absorbing medium and the tubular sections 344 of the honeycomb acoustic medium 330 are fully open, preferably, the honeycomb acoustic medium 330, as well as any curtain made from the honeycomb acoustic medium 330, has an airflow resistance through the medium 330 in a direction generally perpendicular to the planes containing the apexes 336 and 338 of the pleats 350 and 352 forming the first and second major surfaces 332 and 334 of the medium 330 and any pleated curtain made from the medium 330, between 200 MKS rayls and 1000 MKS rayls. The ideal airflow resistance of the honeycomb acoustic medium 330 and depths of the tubular sections 344 forming the honeycomb acoustic medium 330 depends on the spacing of the honeycomb acoustic medium from the glass pane(s) or wall behind the honeycomb acoustic medium. However, a pleated curtain, made from a honeycomb acoustic medium 330 with an airflow resistance between 250 MKS rayls and 350 MKS rayls through the honeycomb acoustic medium 330, in combination with an air space behind such a pleated curtain of about ⅜ to about 1⅛ inches normally absorbs sound quite well.

When the honeycomb acoustic medium 330 is being used as a sound reflecting medium and the tubular sections 344 of the honeycomb acoustic medium 330 are fully open, preferably, the honeycomb acoustic medium 330, as well as any curtain made from the medium, has an airflow resistance through the medium 330, in a direction generally perpendicular to the planes containing the apexes 336 and 338 of the pleats 350 and 352 forming the first and second major surfaces 332 and 334 of the medium 330 and any pleated curtain made from the medium, of at least 10,000 MKS rayls. Preferably, for better sound reflection, the mat forming the major surface of the honeycomb acoustic medium 330 facing the acoustical source, e.g. major surface 332, has an airflow resistance of at least 10,000 MKS rayls.

The honeycomb acoustic media 330 of FIG. 6, is made of a single series of elongated tubular sections 344. However, a honeycomb acoustic media having two or three series of elongated tubular sections 344 (similar to the honeycomb acoustic media of FIGS. 4 and 5, except for the cross section of the tubular sections) can be made from the rectangular or square tubular sections 344.

Figure 7:
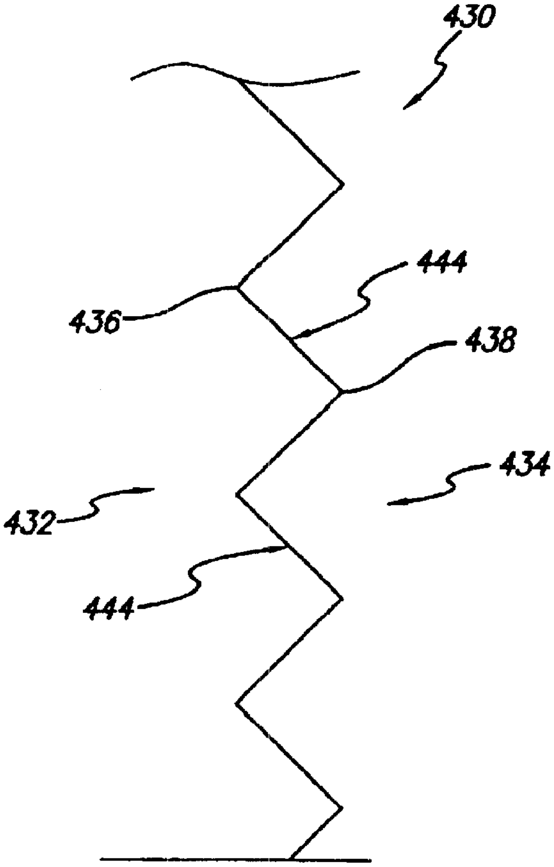
FIG. 7 is a schematic vertical transverse cross section through a fifth embodiment of the acoustic media of the present invention with the pleats fully open.

The pleated acoustic medium 430 of FIG. 7, for absorbing or reflecting sound, forms a continuous pleated curtain of any desired length and width with pleated first and second major surfaces 432 and 434. The apexes 436 and 438 of the pleats forming the first and second major surfaces 432 and 434, respectively, of the pleated acoustic medium 430 each lie or substantially lie in common vertical planes. The pleated acoustic medium 430 is made up of a series of elongated, collapsible, pleats 444 which collectively form the first and second pleated major surfaces 432 and 434 of the honeycomb acoustic medium 430.

The depths of the pleats 444 between the apexes 436 and 438 of the pleats when the pleats are fully open (the thickness of the pleated acoustic medium 430 when the pleats 444 are open), typically, ranges from about ⅜ of an inch to about 1⅛ of an inch. The heights of the pleats 444 between successive apexes 436 or 438 of the pleats 444 when the pleats are fully open, typically, ranges from about ⅜ of an inch to about 1⅛ of an inch. Each of the elongated pleats 444 is collapsible in a direction generally parallel to the planes containing the apexes 436 and 438 of the pleats and forming the first and second major surfaces 432 and 434 of the pleated acoustic medium 430, as well as the major surfaces of any pleated curtain made from the pleated acoustic medium 430 Thus, the pleated acoustic medium 430 and any pleated curtain made from the honeycomb acoustic medium 430 can be retracted, e.g. by winding up the cords 28 and collapsing the elongated pleats 444 and extended, e.g. by unwinding the cords 28 and allowing the elongated pleats 444 to open. Typically, the pleats are formed from a nonwoven mat, a spunbond mat or a woven mat made of various textile materials, such as but not limited to, a nonwoven glass fiber mat or a spunbond mat of polyester, polypropylene or polyethylene.

When the pleated acoustic medium 430 is being used as a sound absorbing medium and the elongated pleats 444 of the pleated acoustic medium 430 are fully open, preferably, the pleated acoustic medium 430, as well as any curtain made from the pleated acoustic medium 430, has an airflow resistance through the medium 430 in a direction generally perpendicular to the planes containing the apexes 436 and 438 of the pleats 444 forming the first and second major surfaces 432 and 434 of the medium 430 and any pleated curtain made from the medium 430, between 200 MKS rayls and 1000 MKS rayls. The ideal airflow resistance of the pleated acoustic medium 430 and depths of the pleats 444 forming the pleated acoustic medium 430 depends on the spacing of the honeycomb acoustic medium from the glass pane(s) or wall behind the honeycomb acoustic medium. However, a pleated curtain, made from a pleated acoustic medium 430 with an airflow resistance between 250 MKS rayls and 350 MKS rayls through the pleated acoustic medium 430, in combination with an air space behind such a pleated curtain of about ⅜ to about 1⅛ inches normally absorbs sound quite well.

When the pleated acoustic medium 430 is being used as a sound reflecting medium and the elongated pleats 444 of the pleated acoustic medium 430 are fully open, preferably, the pleated acoustic medium 430, as well as any curtain made from the medium, has an airflow resistance through the medium 430, in a direction generally perpendicular to the planes containing the apexes 436 and 438 of the pleats 444 forming the first and second major surfaces 432 and 434 of the medium 430 and any pleated curtain made from the medium, of at least 10,000 MKS rayls.

Figure 8:
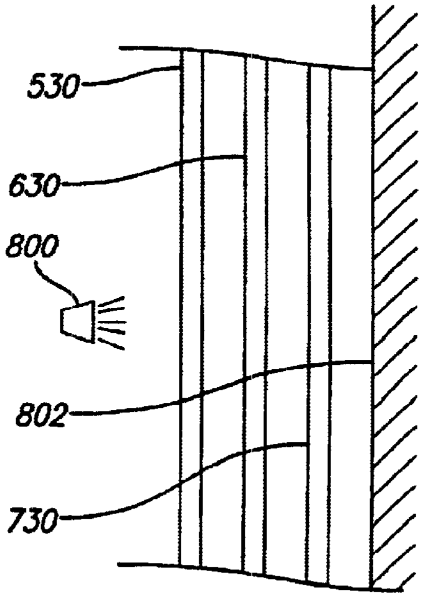
FIG. 8 is a schematic view of a series of curtains, made of acoustic media, intermediate a sound source and a wall.

FIG. 8 schematically shows an vertical end view of a series of three curtains 530, 630 and 730, pleated like the curtain 430 of FIG. 7 or pleatless, located intermediate a sound source 800 and a generally flat, acoustically rigid surface 802, e.g. a wall. While three curtains are shown, two, three or more curtains may be utilized in this embodiment of the invention. The three curtains 530, 630 and 730 may have the same or different airflow resistances; extend in planes generally parallel to each other and the flat, acoustically rigid surface 802 behind the curtains; and are spaced from each other and the surface 802, e.g. spaced from about ⅜ to about 1⅛ inches apart. The curtains 530, 630, and 730 are arranged in either an increasing or decreasing order of airflow resistance and spaced from each other a selected distance or distances, e.g. spaced from each other between ⅜ and 1⅛ inches, to generate an optimum acoustic absorption for a range of sound frequencies between 100 and 4000 Hz. Where the curtains 530, 630 and 730 have different airflow resistances and are to be used as a sound absorbing medium for low frequency sounds, preferably, for better sound absorption at frequencies below 500 cycles per second, the curtain 530 forming the major surface of the medium facing the acoustical source 800 has the greatest airflow resistance and the curtain 730 has the least airflow resistance. Where the curtains 530, 630, and 730 have different airflow resistances and are to be used as a sound absorbing medium for higher frequency sounds, preferably, for better sound absorption at frequencies above 500 cycles per second, the curtain 530 forming the major surface of the medium facing the acoustical source 800 has the lowest airflow resistance and the curtain 730 has the highest airflow resistance.

When the acoustic medium formed by the curtains 530, 630, and 730 is being used as a sound absorbing medium preferably the curtains have a combined airflow resistance through the medium in a direction generally perpendicular to the planes containing the curtains 530, 630, 730 between 200 MKS rayls and 1000 MKS rayls. The ideal airflow resistance of the acoustic medium 30 formed by the curtains 530, 630, and 730 and the spacing between the curtains depends on the spacing of the honeycomb acoustic medium from the glass pane(s) or wall behind the honeycomb acoustic medium. However, two or more curtains with a combined airflow resistance between 250 MKS rayls and 350 MKS rayls, in combination with an air space behind the curtains of about ⅜ to about 1⅛ inches normally absorbs sound quite well. Typically, the curtains 530, 630 and 730 are formed from nonwoven mats, spunbond mats or woven mats made of various textile materials, such as but not limited to, nonwoven glass fiber mats or spunbond mats of polyester, polypropylene or polyethylene.

FIGS. 9–12 schematically illustrate a preferred method of making the collapsible hexagonal tubular sections 44, 144 and 244 of FIGS. 2–5 and FIG. 13 is a more detailed schematic of the preferred construction of the collapsible, hexagonal tubular sections 44, 144 and 244 of FIGS. 2–5. While the discussion will be directed to the method of making the collapsible, hexagonal tubular sections 44 used to form the single series of hexagonal tubular sections of FIG. 2, the method also applies to the method of making the hexagonal tubular sections 144 of the first and second series of sections in FIG. 4 and the hexagonal tubular sections 244 of the first, second and third series of sections in FIG. 5.

Figure 9:
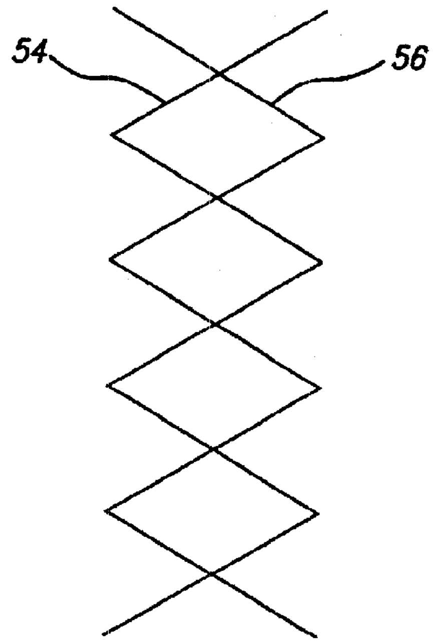
FIGS. 9–12 are a schematic illustration of a method of forming the honeycomb acoustic media of the present invention.
Figure 10:
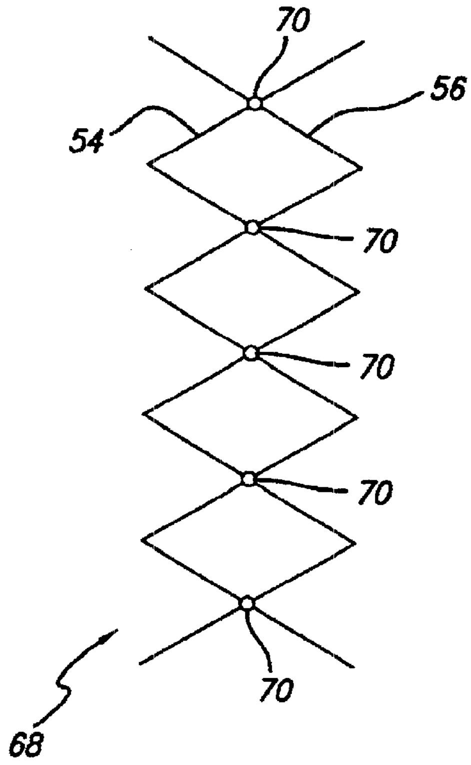

As shown in FIG. 9, two pre-pleated mats 54 and 56 are selected having a desired uniform airflow resistance, a desired length, and a desired width. A major surface of one or both of the mats 54 and 56, that has pleats which are placed in contact with pleats of the other mat, is coated with an adhesive, such as but not limited to, a low temperature, heat activated adhesive. The mats 54 and 56 are then brought into contact with each other with the apex of every second pre-pleat of the mat 54 (the apexes of the inner folds of mat 54) being placed in contact with the apex of every second pre-pleat of the mat 56 (the apexes of the inner folds of mat 56). This two layer construction is then bonded together, e.g. heat bonded together, at the contacting apexes of the inner folds, as represented by the "o's" 70, to form the two layer pleated medium 68 shown in FIG. 10. This two layer pleated medium can be rolled up and stored for later fabrication into the honeycomb acoustic medium 30 of the present invention or immediately fabricated into the honeycomb acoustic medium of the present invention.

Figure 11:
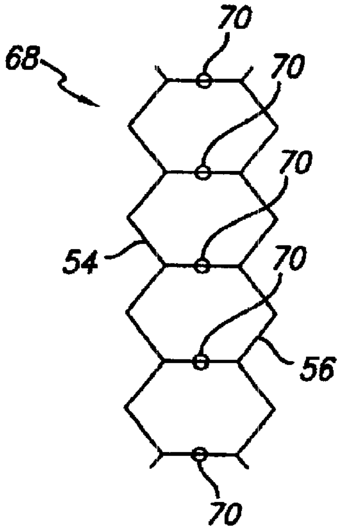
Figure 12:
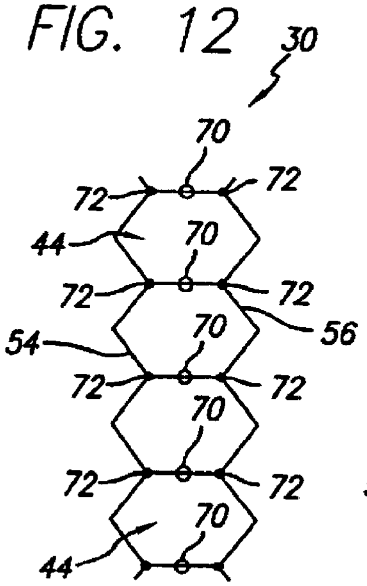
Figure 13:
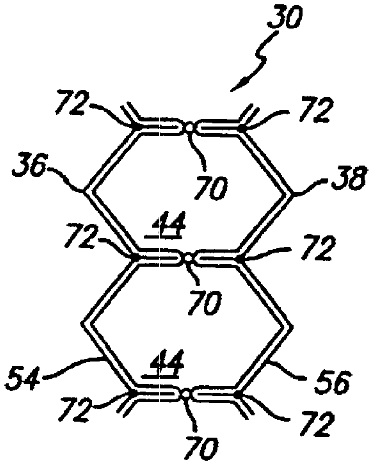
FIG. 13 is a more detailed schematic of the collapsible, elongated tubular section construction of the honeycomb acoustic media of FIGS. 2–5.

In the next fabrication step, tension in the machine direction on the two layer pleated medium is relaxed and the two layer pleated medium is passed through a conventional accordion accumulator (not shown). In this fabrication step, the folds forming the outwardly directed pre-pleats of the two layer medium 68 are pulled apart as shown in FIG. 11 and formed into a hexagonal cross section; two lines of hot melt adhesive (represented by the solid "o"s" 72) are applied to the major surfaces of each of the outwardly directed folds forming the outwardly directed pre-pleats of the two layer medium 68 along the lengths of the folds at a selected distance from the bonded apexes of the inner folds forming the inner pre-pleats of the two layer medium; and the adjacent major surfaces of the outwardly directed folds forming the outwardly directed pre-pleats are bonded together by the lines of hot melt adhesive 72 to form the series of hexagonal tubular sections 44, as shown in FIGS. 12 and 13, which can be collapsed and opened much like the folds of an accordion (like the Duette pleated window shades made by Hunter Douglas, Inc.).

Figure 14:
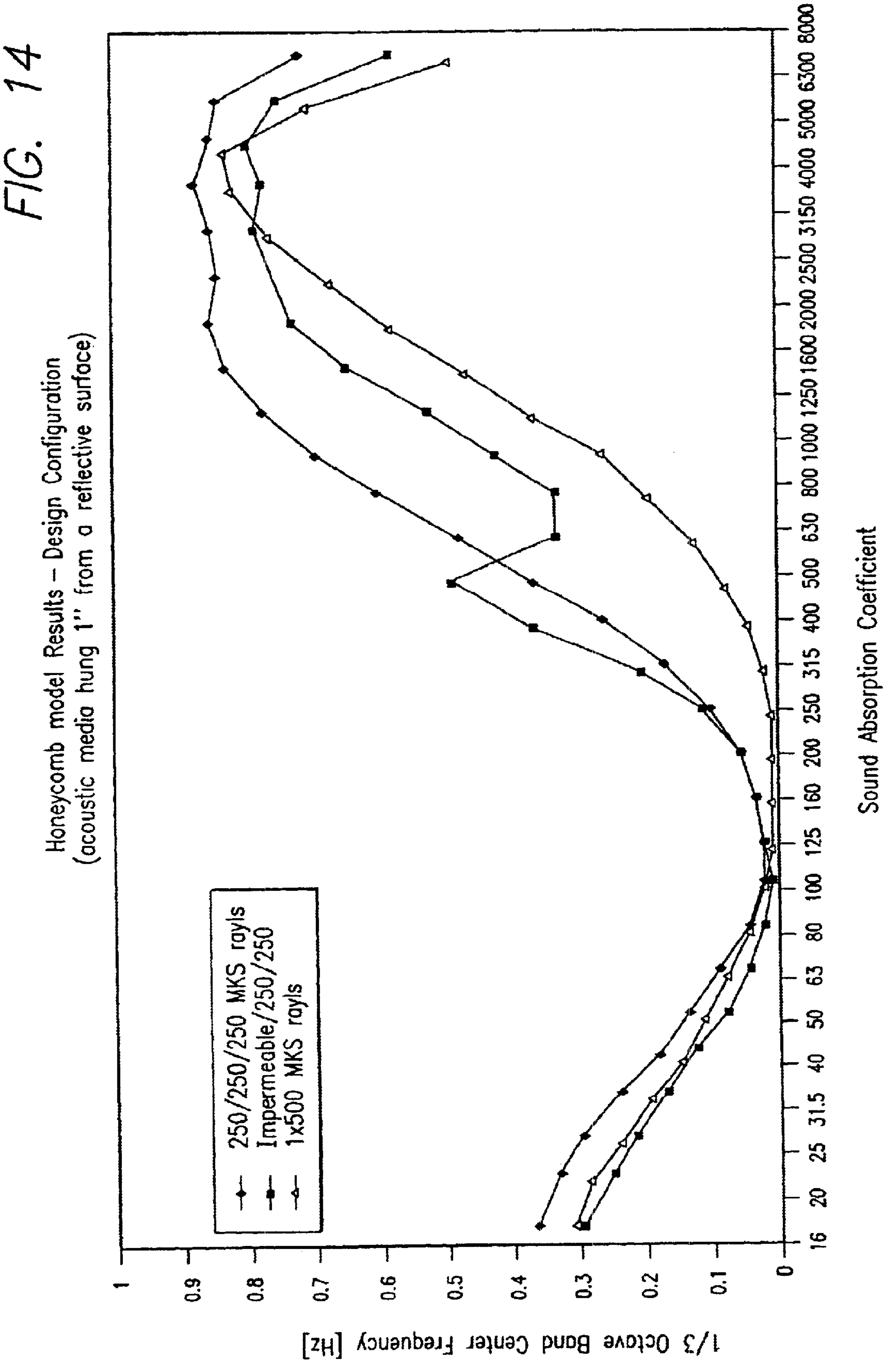
FIGS. 14 and 15 are graphs modeling the performance of honeycomb acoustic media of the present invention.
Figure 15:
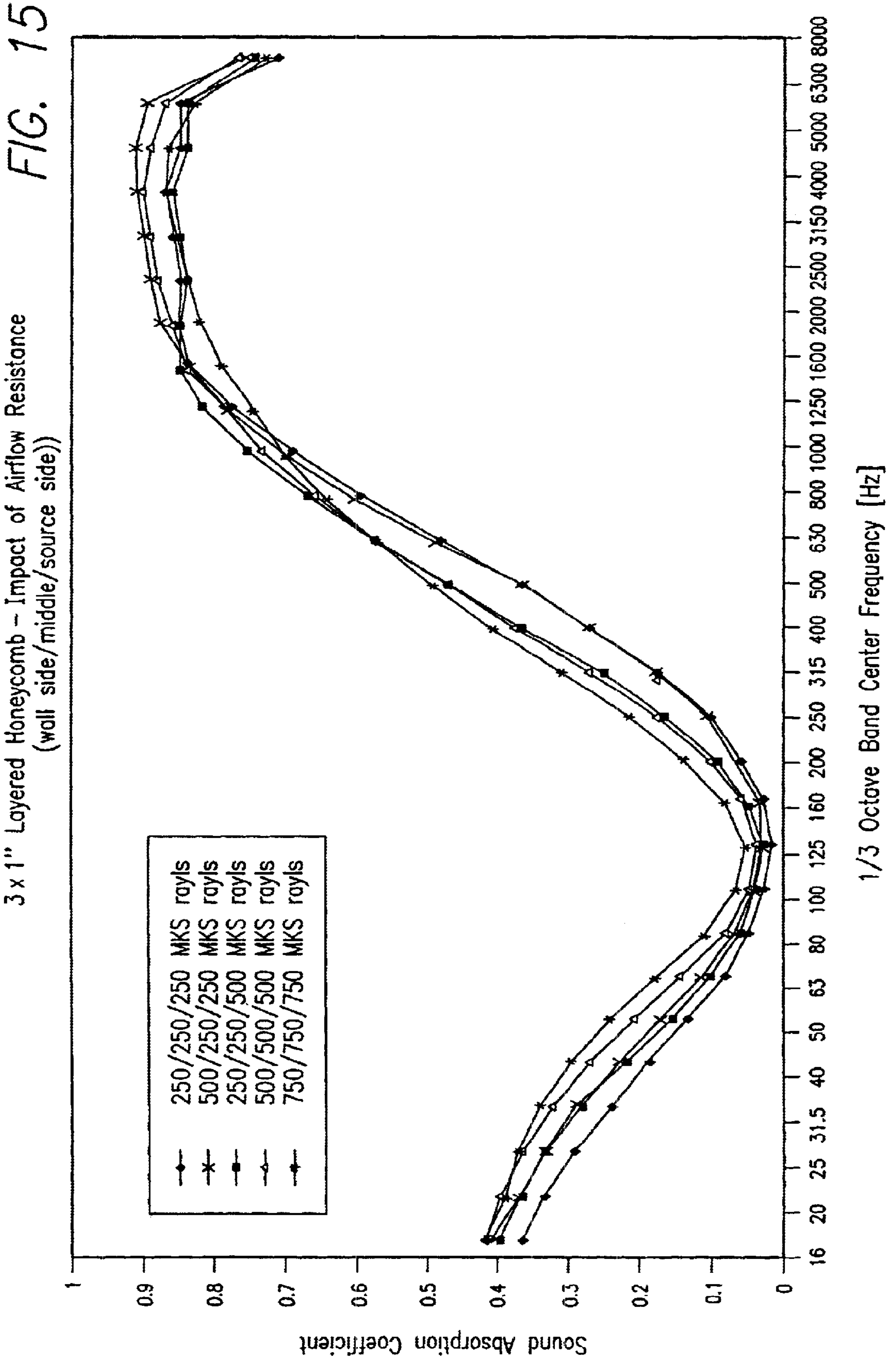

FIGS. 14 and 15 model the performance of various embodiments of the honeycomb acoustic media of the present invention.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An acoustic medium for temporary acoustical treatment of a room, comprising:

a first layer of sound absorbing medium having an airflow resistance; the first layer of sound absorbing medium being extendable and retractable between a stowed position for storage and an extended position, for absorbing sound, where the first layer of sound absorbing medium lies generally in a first plane; a second layer of sound absorbing medium having an airflow resistance; the second layer of sound absorbing medium being extendable and retractable between a stowed position for storage and an extended position, for absorbing sound, where the second layer of sound absorbing medium lies generally in a second plane; the first and second planes being generally parallel with respect to each other; the first layer of sound absorbing medium having a portion, when the first and second layers of sound absorbing medium are extended, that is spaced from a portion of the second layer of sound absorbing medium between about ⅜ inches and about 1⅛ inches to thereby create an air space between the first and second layers of sound absorbing medium to enhance sound absorption by the acoustic medium; and the acoustic medium, when the first and second layers of sound absorbing medium are extended, having an airflow resistance in a direction perpendicular to the first and second planes between 250 MKS rayls and 350 MKS rayls; and a head rail and a bottom rail; the curtain depending from the head rail; means for securing the bottom rail to a bottom end of the curtain and the curtain and the bottom rail to the head rail and for extending and retracting the curtain in a vertical direction.

2. The acoustic medium for temporary acoustical treatment of a room according to claim 1, wherein:

the first layer is intended to face an acoustic source being controlled; and the airflow resistance of the first layer is less than the airflow resistance of the second layer.

3. The acoustic medium for temporary acoustical treatment of a room according to claim 1, wherein:

the first layer is intended to face an acoustic source being controlled; and the airflow resistance of the first layer is greater than the airflow resistance of the second layer.

4. The acoustic medium for temporary acoustical treatment of a room according to claim 1, wherein:

the first layer of sound absorbing medium forms a first pleated surface of a curtain and the second layer of sound absorbing medium forms a second pleated surface of the curtain; and the curtain comprises a series of elongated tubular sections which extend parallel to each other, which each have a polygonal transverse cross section and which are collapsible to retract the curtain and openable to extend the curtain.

5. The acoustic medium for temporary acoustical treatment of a room according to claim 4, wherein:

the elongated tubular sections each have a rectangular or square transverse cross section.

6. The acoustic medium for temporary acoustical treatment of a room according to claim 4, wherein:

the elongated tubular sections each have a hexagonal transverse cross section.

7. An acoustic medium for temporary acoustical treatment of a room, comprising:

a curtain with pleated first and second major surfaces; the curtain comprising a first series of elongated tubular sections with longitudinal centerlines which extend parallel with respect to each other; the tubular sections each having a polygonal transverse cross section; four sides and intermediate apexes of each elongated tubular section forming opposed first and second pleats projecting outwardly with respect to the longitudinal centerline of the elongated tubular section; the first outwardly projecting pleats of the tubular sections collectively forming one of the pleated major surfaces of the curtain; each elongated tubular section being collapsible in a direction generally parallel to planes containing the apexes of the pleats forming the first and second major surfaces of the curtain and perpendicular to the longitudinal centerlines of the elongated tubular sections whereby the curtain can be retracted by collapsing the elongated tubular sections and extended by opening the elongated tubular sections;

a first mat forming the first pleated major surface of the curtain and a second mat forming the second pleated major surface of the curtain;

the elongated tubular sections of the first series of elongated tubular sections, with the elongated tubular sections fully open, having a distance between the apexes of the pleats formed by each elongated tubular section ranging from about ⅜ of an inch to about 1⅛ inches; the pleated curtain, with the elongated tubular sections fully open, having an airflow resistance through the pleated curtain in a direction generally perpendicular to the planes containing the apexes of the pleats forming the first and second major surfaces of the pleated curtain between 250 MKS rayls and 350 MKS rayls; and a head rail and a bottom rail; the curtain depending from the head rail; means for securing the bottom rail to a bottom end of the curtain and the curtain and the bottom rail to the head rail and for extending and retracting the curtain in a vertical direction.

8. The acoustic medium for temporary acoustical treatment of a room according to claim 7 wherein:

the first outwardly projecting pleats of the elongated tubular sections collectively form the first pleated major surface of the curtain and the second outwardly projecting pleats of the elongated tubular sections collectively form the second pleated major surface of the curtain.

9. The acoustic medium for temporary acoustical treatment of a room according to claim 8 wherein:

the elongated tubular sections each have a rectangular or square transverse cross section.

10. The acoustic medium for temporary acoustical treatment of a room according to claim 8, wherein:

the elongated tubular sections each have a hexagonal transverse cross section of six sides and six apexes; and two sides of each of the elongated tubular sections, which are opposed to each other, extend parallel to and are joined to corresponding sides of adjacent elongated tubular sections.

11. The acoustic medium for temporary acoustical treatment of a room according to claim 8, wherein:

the first mat and the second mat have substantially the same level of airflow resistance.

12. The acoustic medium for temporary acoustical treatment of a room according to claim 8, wherein:

the first major surface of the curtain is intended to face an acoustical source being controlled; and the airflow resistance of the first mat is less than the airflow resistance of the second mat.

13. The acoustic medium for temporary acoustical treatment of a room according to claim 8, wherein:

the first major surface of the curtain is intended to face an acoustical source being controlled; and the airflow resistance of the first mat is greater than the airflow resistance of the second mat.

14. The acoustic medium for temporary acoustical treatment of a room according to claim 8, wherein:

the mats are woven, nonwoven or spunbond mats.

15. The acoustic medium for temporary acoustical treatment of a room according to claim 7, wherein:

the curtain comprises the first series of elongated tubular sections and a second series of elongated tubular sections with longitudinal centerlines which extend parallel with respect to each other and the centerlines of the first series of elongated tubular sections; the elongated tubular sections of the second series of tubular sections each having a polygonal transverse cross section; four sides and intermediate apexes of each elongated tubular section in the second series of elongated tubular sections form opposed first and second pleats projecting outwardly with respect to the longitudinal centerline of the elongated tubular section; the second pleats of the first series of elongated tubular sections and the first pleats of the second series of elongated tubular sections are offset with respect to each other, engaged, and secured together; each elongated tubular section of the second series of elongated tubular sections is collapsible in a direction generally parallel to planes containing the apexes of the first and second pleats of the elongated tubular sections and perpendicular to the longitudinal centerlines of the elongated tubular sections whereby the curtain can be retracted by collapsing the elongated tubular sections of the first and second series of elongated tubular sections and extended by opening the elongated tubular sections of the first and second series of elongated tubular sections; and the elongated tubular sections of the second series of elongated tubular sections, with the elongated tubular sections fully open, having a distance between the apexes of the pleats formed by each elongated tubular section ranging from about ⅜ of an inch to about 1⅛ inches.

16. The acoustic medium for temporary acoustic treatment of a room, according to claim 15, wherein:

the second pleats of the second series of elongated tubular sections collectively form the second pleated major surface of the curtain.

17. The acoustic medium for temporary acoustical treatment of a room according to claim 16, wherein:

the elongated tubular sections of the first and second series of elongated tubular sections each have a rectangular or square transverse cross section.

18. The acoustic medium for temporary acoustical treatment of a room according to claim 16, wherein:

the elongated tubular sections of the first and second series of elongated tubular sections each have a hexagonal transverse cross section of six sides and six apexes; and two sides of each of the elongated tubular sections, which are opposed to each other, extend parallel to and are joined to corresponding sides of adjacent elongated tubular sections in the same series of elongated tubular sections.

19. The acoustic medium for temporary acoustical treatment of a room according to claim 16, wherein:

the first mat and the second mat have substantially the same level of airflow resistance.

20. The acoustic medium for temporary acoustical treatment of a room according to claim 16, wherein:

the first major surface of the curtain is intended to face an acoustical source being controlled; and the airflow resistance of the first mat is less than the airflow resistance of the second mat.

21. The acoustic medium for temporary acoustical treatment of a room according to claim 16, wherein:

the first major surface of the curtain is intended to face an acoustical source being controlled; and the airflow resistance of the first mat is greater than the airflow resistance of the second mat.

22. The acoustic medium for temporary acoustical treatment of a room according to claim 16, wherein:

the mats are woven, nonwoven or spunbond mats.

23. An acoustic medium for temporary acoustic treatment of a room, comprising:

a curtain with pleated first and second major surfaces; the curtain comprising a first series of elongated tubular sections with longitudinal centerlines which extend parallel with respect to each other; the tubular sections each having a polygonal transverse cross section; four sides and intermediate apexes of each elongated tubular section forming opposed first and second pleats projecting outwardly with respect to the longitudinal centerline of the elongated tubular section; the first outwardly extending pleats of the tubular sections collectively forming one of the pleated major surfaces of the curtain; each elongated tubular section being collapsible in a direction generally parallel to planes containing the apexes of the pleats forming the first and second major surfaces of the curtain and perpendicular to the longitudinal centerlines of the elongated tubular sections whereby the curtain can be retracted by collapsing the elongated tubular sections and extended by opening the elongated tubular sections;

a first mat forming the first pleated major surface of the curtain and a second mat forming the second pleated major surface of the curtain; and the pleated curtain, with the elongated tubular sections fully open, having an airflow resistance through the pleated curtain in a direction generally perpendicular to the planes containing the apexes of the pleats forming the first and second major surfaces of the pleated curtain being at least 10,000 MKS rayls whereby the curtain functions as a reflective surface with little sound absorption; and a head rail and a bottom rail; the curtain depending from the head rail; means for securing the bottom rail to a bottom end of the curtain and the curtain and the bottom rail to the head rail and for extending and retracting the curtain in a vertical direction.

24. The acoustic medium for temporary acoustical treatment of a room according to claim 23 wherein:

the first outwardly extending pleats of the elongated tubular sections collectively form the first pleated major surface of the curtain and the second outwardly extending pleats of the elongated tubular sections collectively form the second pleated major surface of the curtain.

25. The acoustic medium for temporary acoustical treatment of a room according to claim 24, wherein:

the elongated tubular sections each have a rectangular or square transverse cross section.

26. The acoustic medium for temporary acoustical treatment of a room according to claim 24, wherein:

the elongated tubular sections each have a hexagonal transverse cross section of six sides and six apexes; and two sides of each of the elongated tubular sections, which are opposed to each other, extend parallel to and are joined to corresponding sides of adjacent elongated tubular sections.

27. The acoustic medium for temporary acoustical treatment of a room according to claim 24, wherein:

the first major surface of the curtain is intended to face an acoustical source being controlled; and the airflow resistance of the first mat, with the elongated tubular sections fully open, is at least 10,000 MKS rayls.

28. The acoustic medium for temporary acoustical treatment of a room according to claim 24, wherein:

the mats are woven, nonwoven or spunbond mats.

29. An acoustic medium for temporary acoustic treatment of a room, comprising:

a curtain with pleated first and second major surfaces; the pleated first and second major surfaces being formed by a continuous mat with a series of elongated parallel pleats; each elongated pleat being collapsible in a direction generally parallel to planes containing the apexes of the pleats forming the first and second major surfaces of the curtain whereby the curtain can be retracted by collapsing the elongated pleats and extended by opening the elongated pleats;

the pleated curtain, with the elongated pleats fully open, having an airflow resistance through the pleated curtain in a direction generally perpendicular to the planes containing the apexes of the pleats forming the first and second major surfaces of the pleated curtain between 250 MKS rayls and 350 MKS rayls;

a head rail and a bottom rail; the curtain depending from the head rail; means for securing the bottom rail to a bottom end of the curtain and the curtain and the bottom rail to the head rail and for extending and retracting the curtain in a vertical direction.

30. An acoustic medium for temporary acoustic treatment of a room, comprising:

a curtain with pleated first and second major surfaces; the pleated first and second major surfaces being formed by a continuous mat with a series of elongated parallel pleats; each elongated pleat being collapsible in a direction generally parallel to planes containing the apexes of the pleats forming the first and second major surfaces of the curtain whereby the curtain can be retracted by collapsing the elongated pleats and extended by opening the elongated pleats;

the pleated curtain, with the elongated pleats fully open, having an airflow resistance through the pleated curtain in a direction generally perpendicular to the planes containing the apexes of the pleats forming the first and second major surfaces of the pleated curtain of at least 10,000 MKS rayls;

a head rail and a bottom rail; the curtain depending from the head rail; means for securing the bottom rail to a bottom end of the curtain and the curtain and the bottom rail to the head rail and for extending and retracting the curtain in a vertical direction.

* * * * *